G. P. YOUMANS.
PIPE COUPLING.
APPLICATION FILED OCT. 22, 1906.
903,260.
Patented Nov. 10, 1908.
2 SHEETS—SHEET 1.
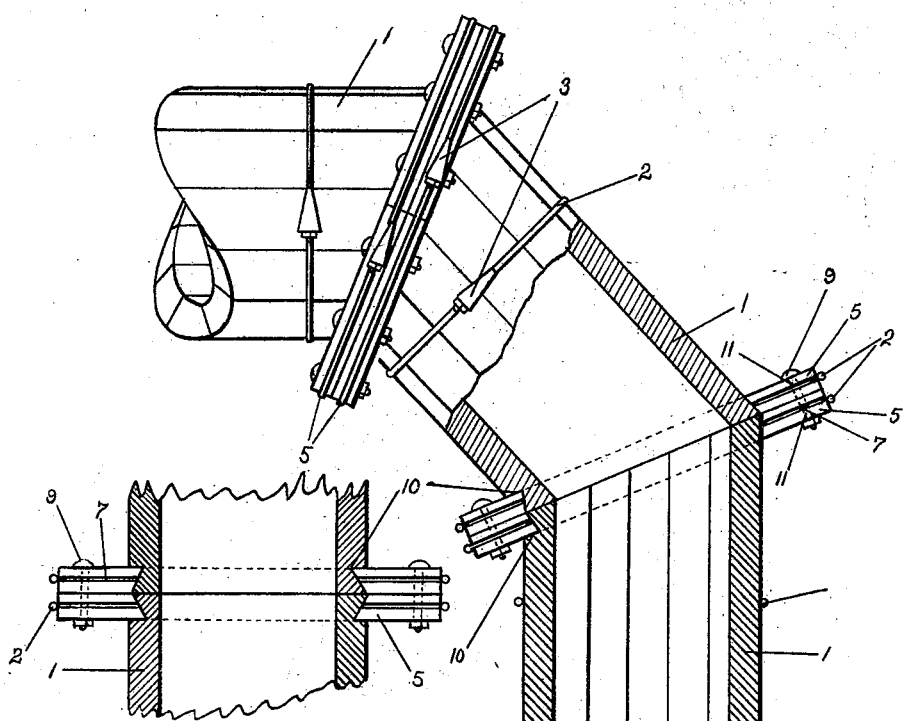
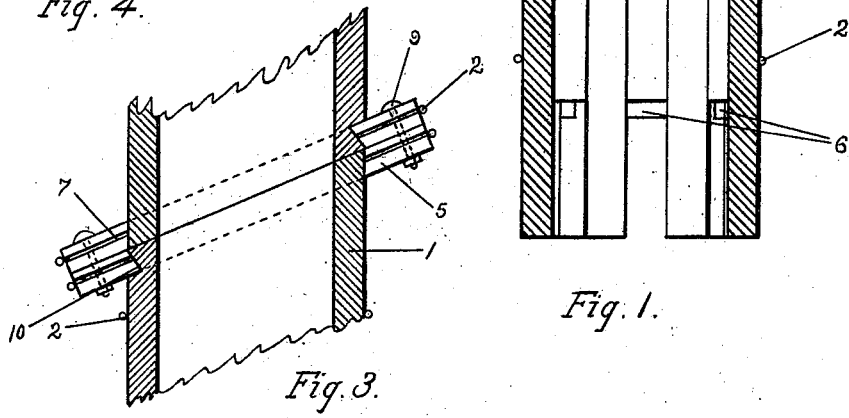
Witnesses
Gertrude Tallman
Luella Greenfield
Inventor
George P. Youmans
By Chappell Earl
Attorneys

G. P. YOUMANS.
PIPE COUPLING.
APPLICATION FILED OCT. 22, 1906.

903,260.

Patented Nov. 10, 1908.
2 SHEETS—SHEET 2.

UNITED STATES PATENT OFFICE.

GEORGE P. YOUMANS, OF GALESBURG, MICHIGAN, ASSIGNOR TO THE KALAMAZOO TANK AND SILO COMPANY, OF KALAMAZOO, MICHIGAN.

PIPE-COUPLING.

No. 903,260.     Specification of Letters Patent.     Patented Nov. 10, 1908.

Application filed October 22, 1906. Serial No. 340,037.

*To all whom it may concern:*

Be it known that I, GEORGE P. YOUMANS, a citizen of the United States, residing at the village of Galesburg, county of Kalamazoo, and State of Michigan, have invented certain new and useful Improvements in Pipe-Couplings, of which the following is a specification.

This invention relates to improvements in pipe couplings.

The main object of this invention is to provide an improved pipe coupling particularly adapted for use on large pipes of wood whereby they may be quickly and securely connected when placed in position for use, the sections being arranged at any desired angle to each other, or in a straight line as may be desired.

A further object is to provide an improved pipe coupling which is very secure and at the same time one which is economical and easily applied.

Further objects, and objects relating to structural details, will definitely appear from the detailed description to follow.

I accomplish the objects of my invention by the devices and means described in the following specification.

The invention is clearly defined and pointed out in the claims.

Figure 2:
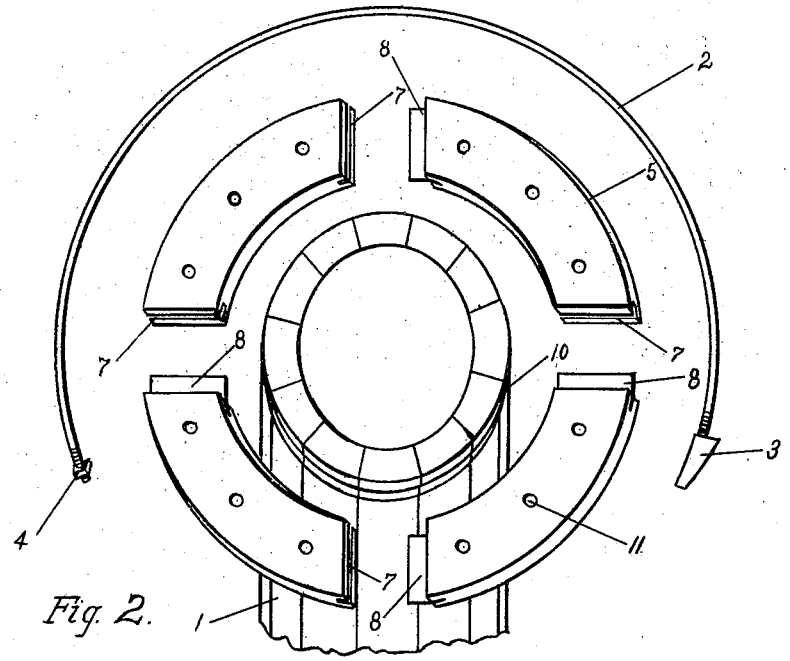
Figure 5:
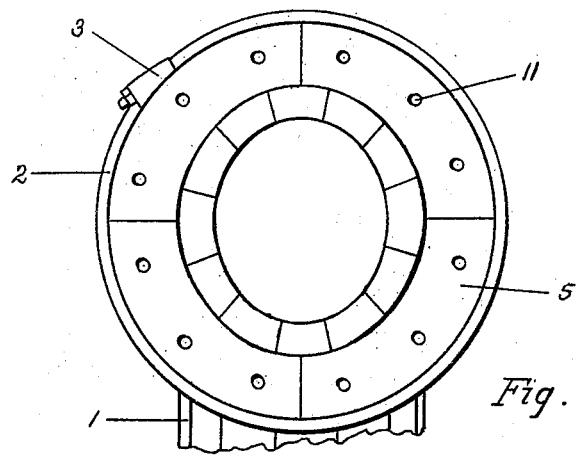

A structure embodying the features of my invention is clearly illustrated in the accompanying drawing, forming a part of this specification, in which, Figure 1 is a detail view partially in central longitudinal section of a structure embodying the features of my invention. Fig. 2 is a detail perspective showing parts of my improved pipe coupling and their relation. Fig. 3 is a central longitudinal section, showing the pipe sections having beveled or mitered ends arranged to form a straight joint. Fig. 4 is an elevation of one of the coupling rings 5. Fig. 5 is a detail view of a modified construction, showing my improved coupling applied to pipe sections arranged to form a straight joint, the ends of the pipe sections being cut at right angles.

In the drawing, similar reference characters refer to similar parts throughout the several views.

Referring to the drawing, the sections of the pipe 1 are preferably formed of wood staves, fitted together and bound by hoops 2. In the structure shown in Fig. 1, in which the pipe sections are arranged at an angle, the meeting ends of the sections are mitered or beveled to form a suitable joint. The meeting ends of the pipe sections are grooved on the inside of the angle to conform the inner to the outer end of the ellipse, the grooves being somewhat V-shaped and gradually diminishing in depth, as appears in Fig. 2.

The coupling rings 5 are also preferably made of wood and formed of sections 6 which are tongued and grooved together, the sections being provided with tongues 8 and grooves 7 in their ends. The ring sections are preferably provided with no other connections than the tongues and grooves so that they may be readily closed upon the pipe by the binding or clamping hoops 2. These rings are shaped on the inside to fit the grooved ends of the pipe sections, as clearly appears in Fig. 1. The hoops 2 are preferably provided with couplings 3 at one end and a nut 4 at the other so that they may be tightened upon the pipe sections to clamp them in place. The peripheries of the rings 5 are preferably true circles and the bolt holes 11 for the bolts 9 also lie in a circle and are uniformly spaced. When thus formed, by turning the pipe sections in relation to each other, the angle of the joint can be varied as desired, there being as many variations as there are bolt holes 11, the same coupling thus being adapted for use in forming a joint of any desired angle or a straight joint when the mitered or beveled ends of the pipe sections are placed in opposite relation.

In the modified construction shown in Fig. 4, the ends of the pipe sections are cut at right angles and the grooves 7 entirely encircle the same.

By arranging the parts as I have illustrated and described, I secure a pipe coupling which is very secure and may be very quickly and easily applied. While my improved pipe coupling is particularly adapted for use on wood pipes of large diameters, it is advantageous for use in other relations.

I have illustrated and described my improved pipe coupling in detail in the form preferred by me although I am aware that it is capable of considerable variation in structural details without departing from my invention.

Having thus described my invention, what

I claim as new and desire to secure by Letters Patent is:

1. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings formed of sections having their ends tongued and grooved together, said rings being shaped on the inside to fit the grooved ends of said pipe sections, the peripheries of said rings being circles, said rings being provided with a plurality of uniformly transverse bolt holes arranged in a circle; bolts for securing said rings together; hoops about said rings; and means for tightening said hoops, for the purpose specified.

2. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings formed of sections having their ends tongued and grooved together, said rings being shaped on the inside to fit the grooved ends of said pipe sections, the peripheries of said rings being circles, said rings being provided with a plurality of uniformly spaced transverse bolt holes arranged in a circle; bolts for securing said rings together and hoops about said rings, for the purpose specified.

3. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings formed of sections having their ends tongued and grooved together, said rings being shaped on the inside to fit the grooved ends of said pipe sections; bolts for securing said rings together; hoops about said rings; and means for tightening said hoops, for the purpose specified.

4. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings formed of sections having their ends tongued and grooved together, said rings being shaped on the inside to fit the grooved ends of said pipe sections, bolts for securing said rings together; for the purpose specified.

5. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings formed of sections having their ends tongued and grooved together, said rings being shaped on the inside to fit the grooved ends of said pipe sections; hoops about said rings; and means for tightening said hoops, for the purpose specified.

6. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings formed of sections having their ends tongued and grooved together, said rings being shaped on the inside to fit the grooved ends of said pipe sections, the peripheries of said rings being circles, said rings being provided with a plurality of uniformly spaced transverse bolt holes arranged in a circle; and means for securing said rings together, for the purpose specified.

7. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings shaped on the inside to fit the grooved ends of said pipe sections, the peripheries of said rings being circles, said rings being provided with a plurality of uniformly spaced transverse bolt holes arranged in a circle; bolts for securing said rings together and hoops about said rings, for the purpose specified.

8. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings, shaped on the inside to fit the grooved ends of said pipe sections; bolts for securing said rings together and hoops about said rings, for the purpose specified.

9. In a pipe coupling, the combination with the pipe sections to be joined arranged at an angle to each other with their ends dressed to form a miter or bevel joint, said pipe sections having peripheral grooves at their meeting ends on the inside of the angle thereof, said grooves being gradually diminished in depth at their ends, of a pair of coupling rings shaped on the inside to fit the grooved ends of said pipe sections; and means for securing said rings together, for the purpose specified.

10. In a pipe coupling, the combination with the pipe sections to be joined, having peripheral grooves at their meeting ends, of a pair of coupling rings formed of sections having their ends tongued and grooved together, said rings being shaped on the inside to fit the grooved ends of said pipe sections and being provided with a plurality of transverse spaced bolt holes arranged in a circle, whereby the relative position of the rings may be varied; bolts for securing said rings together; hoops about said rings; and means for tightening said hoops, for the purpose specified.

11. In a pipe coupling, the combination with the pipe sections to be joined, having peripheral grooves at their meeting ends, of a pair of coupling rings formed of sections having their ends tongued and grooved together, said rings being shaped on the inside to fit the grooved ends of said pipe sections; bolts for securing said rings together and hoops about said rings, for the purpose specified.

12. In a pipe coupling, the combination with the pipe sections to be joined, having peripheral grooves at their meeting ends, of a pair of coupling rings formed of sections, and being provided with a plurality of transverse spaced bolt holes arranged in a circle, whereby the relative position of the rings may be varied, said rings being shaped on the inside to fit the grooved ends of said pipe sections; bolts for securing said rings together; and hoops for said rings, for the purpose specified.

In witness whereof, I have hereunto set my hand and seal in the presence of two witnesses.

GEORGE P. YOUMANS. [L. S.]

Witnesses:
LULU G. GREENFIELD,
OTIS A. EARL.